Patented Nov. 21, 1922.

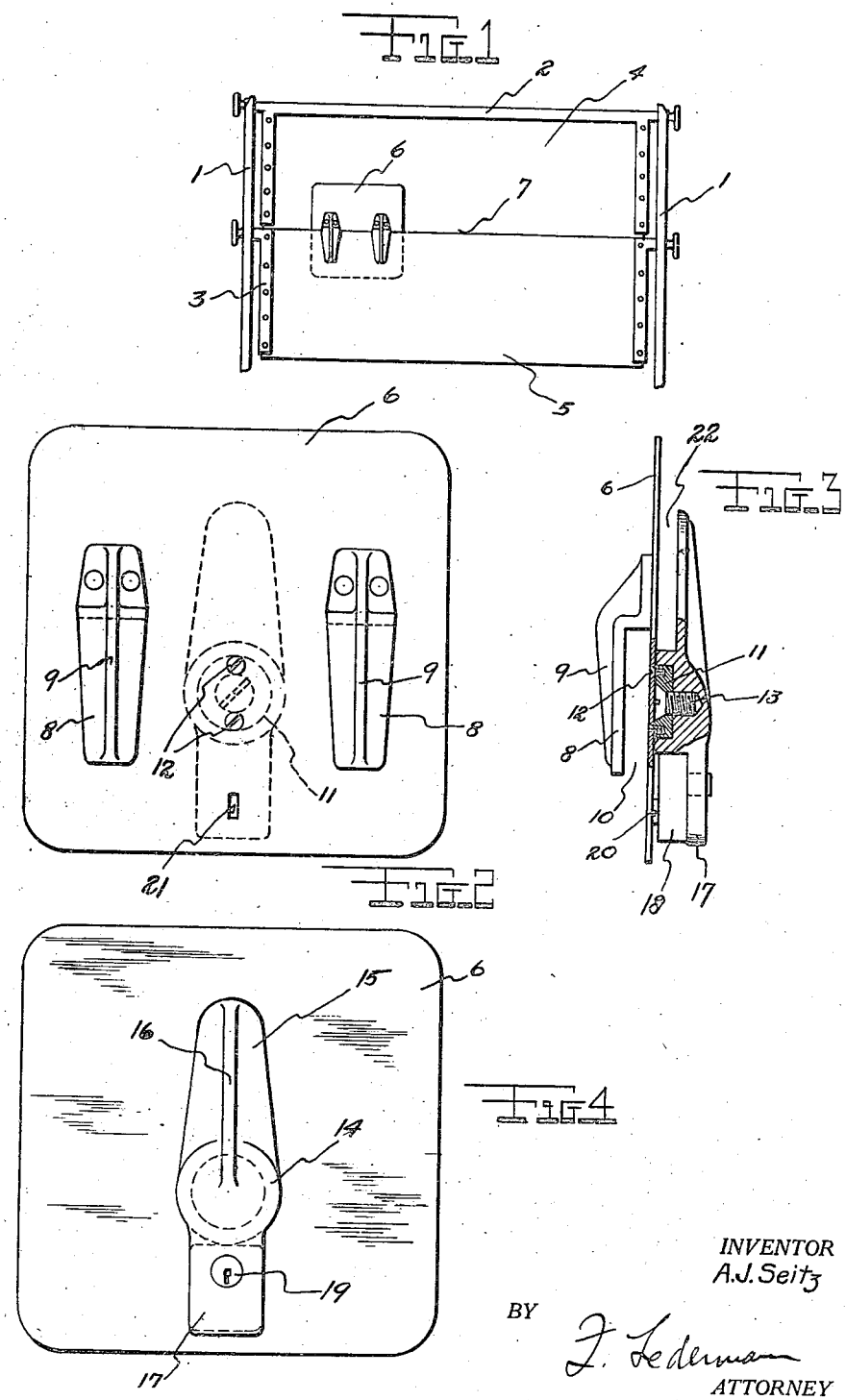

1,436,410

UNITED STATES PATENT OFFICE.

ARTHUR J. SEITZ, OF NEW YORK, N. Y.

WINDSHIELD PARKING SIGN.

Application filed August 10, 1922. Serial No. 580,835.

*To all whom it may concern:*

Be it known that I, ARTHUR J. SEITZ, a citizen of the United States, residing at New York, in the county of New York and State of New York, have invented certain new and useful Improvements in Windshield Parking Signs, of which the following is a specification.

This invention relates to signs more particularly to a device which is attachable to the facing of an automobile windshield the main object being to provide an indicator which discloses that the automobile to which it is attached, is under control of an unauthorized person.

Another object is to provide a device which is simple in construction and can be readily locked in a conspicuous place on the windshield.

These and other objects will become apparent in the description below, in which characters of reference refer to like-named parts in the drawing.

Referring briefly to the drawing, Figure 1 is a front elevational view of an automobile windshield showing the sign in position thereon.

Figure 2 is a front elevational view of the sign.

Figure 3 is a side elevational view of the same, the locking arm being shown partly in section.

Figure 4 is a rear elevational view of the sign showing the arm in locked position.

Describing the drawing in detail, the numeral 1 indicates the side frames of an automobile between which an upper frame 2 and lower frame 3 are pivotally suspended. An upper 4 and a lower windshield glass 5 are mounted in their respective frames.

The sign comprising a substantially square platen 6 is suspended or hung from the upper edge 7 of the lower windshield 5, the suspending means being brackets 8 which are secured to the back surface of the platen and have a reinforcing web 9 running centrally thru their length. The channels 10 formed by said brackets are receptive of the lower windshield 5.

The opposite surface of said platen 6 has an annular collar 11 secured thereto by small screws 12. A relatively large pivot screw 13 is rotatably secured centrally in the collar 11. The tapered head being concealed beneath the platen 6 and cannot be tampered with when the sign is in place on the windshield.

The threaded end of said pivot screw 13 engages the hub 14 of a locking arm 15, the latter also being provided with a reinforcing web 16. Said locking arm rotates about the centre formed by the collar 11, and the extension 17, diametrically opposite arm 15, has a common type of lock 18 securely mounted therebeneath.

The lock lug 19 is channelled so as to receive a key therein, and passes thru the projection 17 of the locking arm 15 and has its face exposed. The bolt 20 of the said lock 18 is actuated by manipulation of the key, and when in locked position, engages the slot 21 in the platen 6.

In locking the sign on a windshield, the locking arm 15 is rotated to the horizontal position and the platen is then hung upon the lower windshield panel 5 by suspending the platen from the brackets 20. Said windshield 5 will enter into the channels 10.

The upper windshield 4 is then rotated into the vertical position until it lies adjacent to the surface of platen 6, and when the locking arm 15 is rotated into vertical position, said windshield 4 will lie in the channel 23. Obviously, after the locking arm has been locked in position, the sign can be slid the length of the windshield but cannot be removed therefrom.

The screws 12 which hold the centering collar 11 in place are visible, but cannot be tampered with as they are in position behind the windshield 5 which must first be broken before the windshield sign can be removed.

I claim:—

1. A device of the class described comprising a square platen, brackets on said platen adapted to be suspended or hung from the lower windshield panel, and means for locking adjacent windshield panel in aligned position.

2. A device of the class described comprising a square platen, brackets secured to one side thereof, said brackets adapted to be hung from a lower windshield panel, the upper windshield panel adapted to lie on the opposite side and adjacent to said platen, and a pivoted locking arm adapted to secure said panels in aligned position.

3. A device of the class described comprising a square platen, brackets secured to one side thereof, said brackets adapted to be hung from a lower windshield panel, the upper windshield panel adapted to lie on the opposite side and adjacent to said platen, a collar on the opposite side of said platen, a locking arm rotatable upon said collar, a locking arm pivot screw in said collar having its head concealed behind said platen, and a lock on said arm adapted to have its bolt engage a slot in said platen, when manipulated.

In witness whereof, I affix my signature.

ARTHUR J. SEITZ.